United States Patent
Matsumoto et al.

(10) Patent No.: US 7,989,100 B2
(45) Date of Patent: Aug. 2, 2011

(54) SEALED PRISMATIC BATTERY

(75) Inventors: Yoshimi Matsumoto, Ibaraki (JP); Osamu Watanabe, Ibaraki (JP); Yoshiki Somatomo, Ibaraki (JP)

(73) Assignee: Hitachi Maxell Energy, Ltd., Kyoto (JP)

( * ) Notice: Subject to any disclaimer, the term of this patent is extended or adjusted under 35 U.S.C. 154(b) by 246 days.

(21) Appl. No.: 11/518,940

(22) Filed: Sep. 12, 2006

(65) Prior Publication Data

US 2007/0059586 A1 Mar. 15, 2007

(30) Foreign Application Priority Data

Sep. 13, 2005 (JP) .................. 2005-264745

(51) Int. Cl.
*H01M 2/12* (2006.01)
(52) U.S. Cl. ................. 429/53; 429/56; 429/82; 429/83
(58) Field of Classification Search .................... 429/89, 429/53–56, 82–85
See application file for complete search history.

(56) References Cited

U.S. PATENT DOCUMENTS

2005/0112455 A1* 5/2005 Marubayashi et al. ......... 429/56

FOREIGN PATENT DOCUMENTS

| JP | 10-261391 A | 9/1998 |
|---|---|---|
| JP | 11-273640 A | 10/1999 |
| JP | 2000-260410 A | 9/2000 |
| JP | 2001-256944 A | 9/2001 |
| JP | 2002-8615 A | 1/2002 |
| JP | 2004-178820 | * 6/2004 |

OTHER PUBLICATIONS

Korean Office Action dated Dec. 30, 2009, issued in Korean Patent Application No. 10-2006-0088115.

* cited by examiner

*Primary Examiner* — Patrick Ryan
*Assistant Examiner* — Ben Lewis
(74) *Attorney, Agent, or Firm* — Birch, Stewart, Kolasch & Birch, LLP

(57) ABSTRACT

A sealed prismatic battery according to the present invention comprises a laterally long cap sealing an opening of an upper surface of a battery can and a safety vent placed on the cap and having a thin-walled valve body which opens in an abnormal rise of a battery internal pressure. The safety vent has an oval-shaped circumferential groove formed inside an oval-shaped coining section provided on an outer surface of the cap and on one end side in a lateral direction of the cap and a thin-walled valve body surrounded thereby, and the oval-shaped circumferential groove is composed of lateral side sections parallel to the lateral direction of the cap and circular arc sections connecting these lateral side sections, with one lateral side section, other lateral side section, and the thin-walled valve body of the safety vent respectively having a thickness increased in this order.

7 Claims, 6 Drawing Sheets

SEALED PRISMATIC BATTERY

BACKGROUND OF THE INVENTION

The present invention relates to a sealed prismatic battery having a safety vent which opens in an abnormal rise of battery internal pressure.

In recent years, slim and lightweight electronic equipment such as cell phones and personal digital assistances is in widespread use. A small and lightweight battery having high capacity is used as a power supply for the electronic equipment. With increased functionality of the electronic equipment, there is a high demand for battery with higher capacity. A primary battery with use of lithium as an active material and a secondary battery performing charge and discharge operations with use of lithium ion are in particular widely used because of their lightweight and high capacity features, and so the development for the higher capacity is actively being pursued.

In such batteries, upon application of an excessive electric load or application of an excessive thermal load, a short-circuited state is generated inside the batteries, resulting in generation of gas, which leads to an abnormal rise of battery internal pressure. Also in the case where the batteries are put in an over-charged state, gas is generated inside the batteries due to decomposition of electrolyte, which causes an abnormal rise of battery internal pressure. When the battery reaches the point of being unable to withstand the abnormal rise of the internal pressure, it explodes and strews its contents over. Accordingly, the battery has a safety vent which opens upon reaching a specified internal pressure so as to release the battery internal pressure in order to prevent burst of the batteries from occurring.

A sealed prismatic battery is often used as the battery for the electronic equipment and a thinner shape of the sealed prismatic battery is demanded. This leads to decrease of the area of the safety vent, and therefore even when the battery internal pressure reaches a specified value, it becomes difficult to open the safety vent only with the internal pressure of the battery to release the internal pressure as shown in JP 2001-256944 A (pages 2 to 4, FIGS. 1 to 12) and JP H11-273640 A (pages 3 to 5, FIGS. 4 to 8). If the safety vent provided on a cap is enlarged or the thickness of a thin film section or a thin-walled section is decreased in order to enhance opening efficiency, there is a possibility of not only the damage on the vent and the deformation of the cap upon impact caused by falling of the battery or the like but also the opening of the vent when the battery is stored in the normal circumstance.

Accordingly, as shown in JP H10-261391 A (pages 2 to 3, FIGS. 2 to 4), JP 2000-260410 A (pages 2 to 3, FIGS. 1 and 2), and JP 2002-008615 A (pages 2 to 4, FIGS. 1 and 2), there has been used a vent structure in which a vent opens with relatively low internal pressure of the battery with use of deformation due to expansion of the battery caused by a rise of the internal pressure thereof, although the structure does not fully satisfy the demand for enhancing impact resistance.

SUMMARY OF THE INVENTION

An object of the present invention is to provide, in view of solving the above problem, a sealed prismatic battery capable of stably opening a safety vent with relatively low working pressure and excellent in durability upon impact caused by falling of the battery or the like.

A sealed prismatic battery, including:
a laterally long cap sealing an opening of an upper surface of a battery can; and
a safety vent placed on the cap and having a thin-walled valve body which opens in an abnormal rise of a battery internal pressure,
wherein the safety vent has an oval-shaped circumferential groove formed inside an oval-shaped coining section provided on an outer surface of the cap and on one end side in a lateral direction of the cap and a thin-walled valve body surrounded thereby, and the oval-shaped circumferential groove is composed of lateral side sections parallel to the lateral direction of the cap and circular arc sections connecting these lateral side sections, with one lateral side section, other lateral side section, and the thin-walled valve body of the safety vent respectively having a thickness increased in this order.

In the sealed prismatic battery according to the present invention, a thickness of the other lateral side section in the circumferential groove may be 1.5 to 3.0 times larger than a thickness of one lateral side section in the circumferential groove.

In the sealed prismatic battery according to the present invention, a thickness of the thin-walled valve body in the safety vent may be 2.0 to 5.0 times larger than a thickness of one lateral side section in the circumferential groove.

In the sealed prismatic battery according to the present invention, a width of the oval-shaped safety vent may be 60 to 75% of a width of the cap.

BRIEF DESCRIPTION OF THE DRAWINGS

The present invention will be further described with reference to the accompanying drawings wherein like reference numerals refer to like parts in the several views, and wherein.

DETAILED DESCRIPTION OF THE PREFERRED EMBODIMENTS

Figure 1:
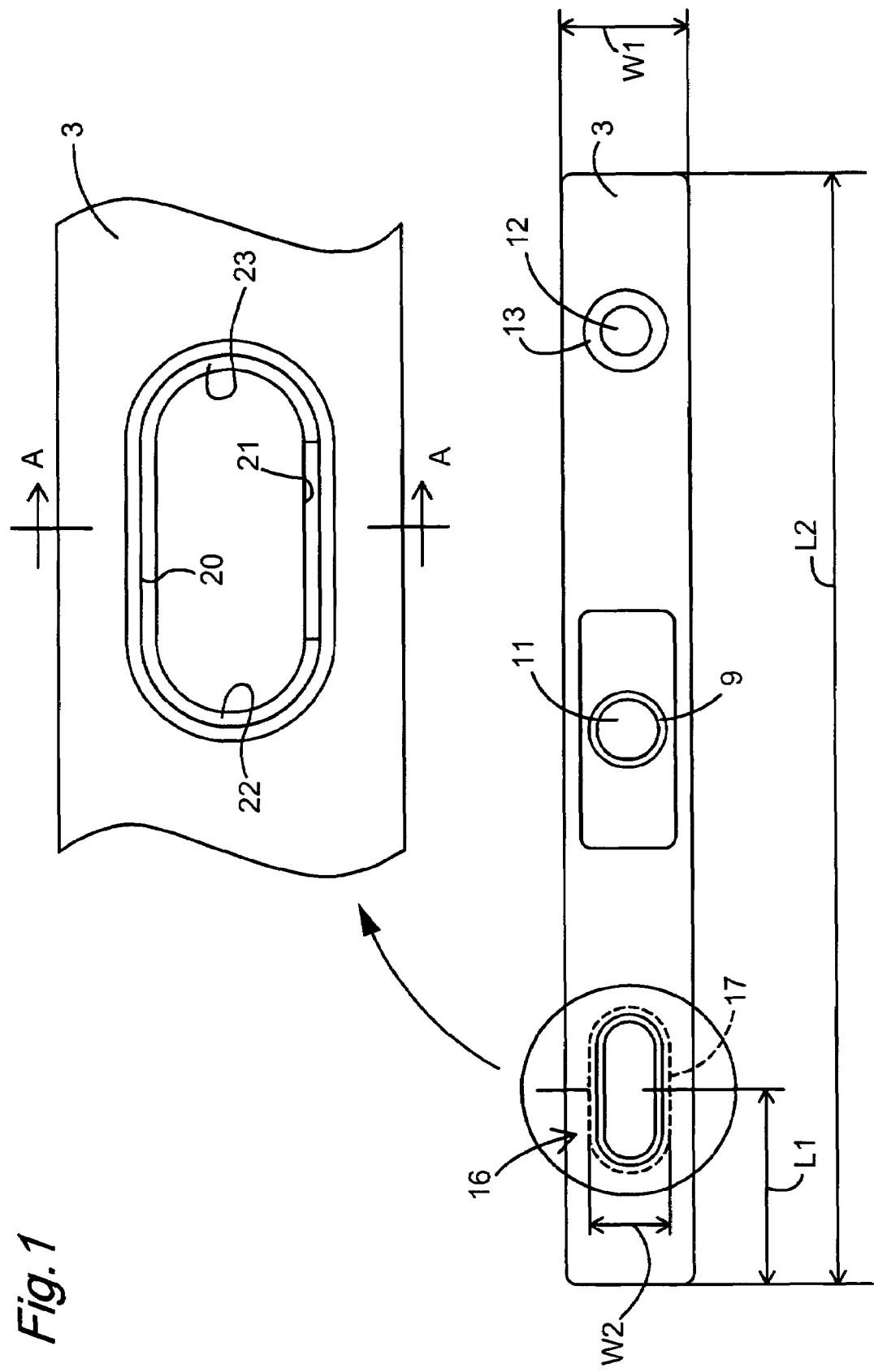
FIG. 1 is a plan view showing a cap of a sealed prismatic battery in an embodiment 1.

A sealed prismatic battery in the present invention includes, as shown in FIG. 1, a laterally long cap 3 sealing an opening of an upper surface of a battery can 1 and a safety vent 16 placed on the cap 3 and opening in an abnormal rise of a battery internal pressure.

In the sealed prismatic battery, the safety vent 16 has, as shown in FIG. 1, an oval-shaped circumferential groove 19 formed inside an oval-shaped outermost coining section 17 provided on an outer surface of the cap 3 and on one end side in a lateral direction (or a right-and-left direction) of the cap 3 and a thin-walled valve body 25 surrounded thereby. The oval-shaped circumferential groove 19 is composed of linear lateral side sections 20, 21 parallel to the lateral direction of the cap 3 and circular arc sections 22, 23 connecting these lateral side sections 20, 21. The lateral side section 20, the lateral section 21 and the thin-walled valve body 25 are different in thickness, and more specifically, the lateral section 20, the lateral section 21 and the thin-walled valve body 25 are set to be thicker in this order.

Figure 4:
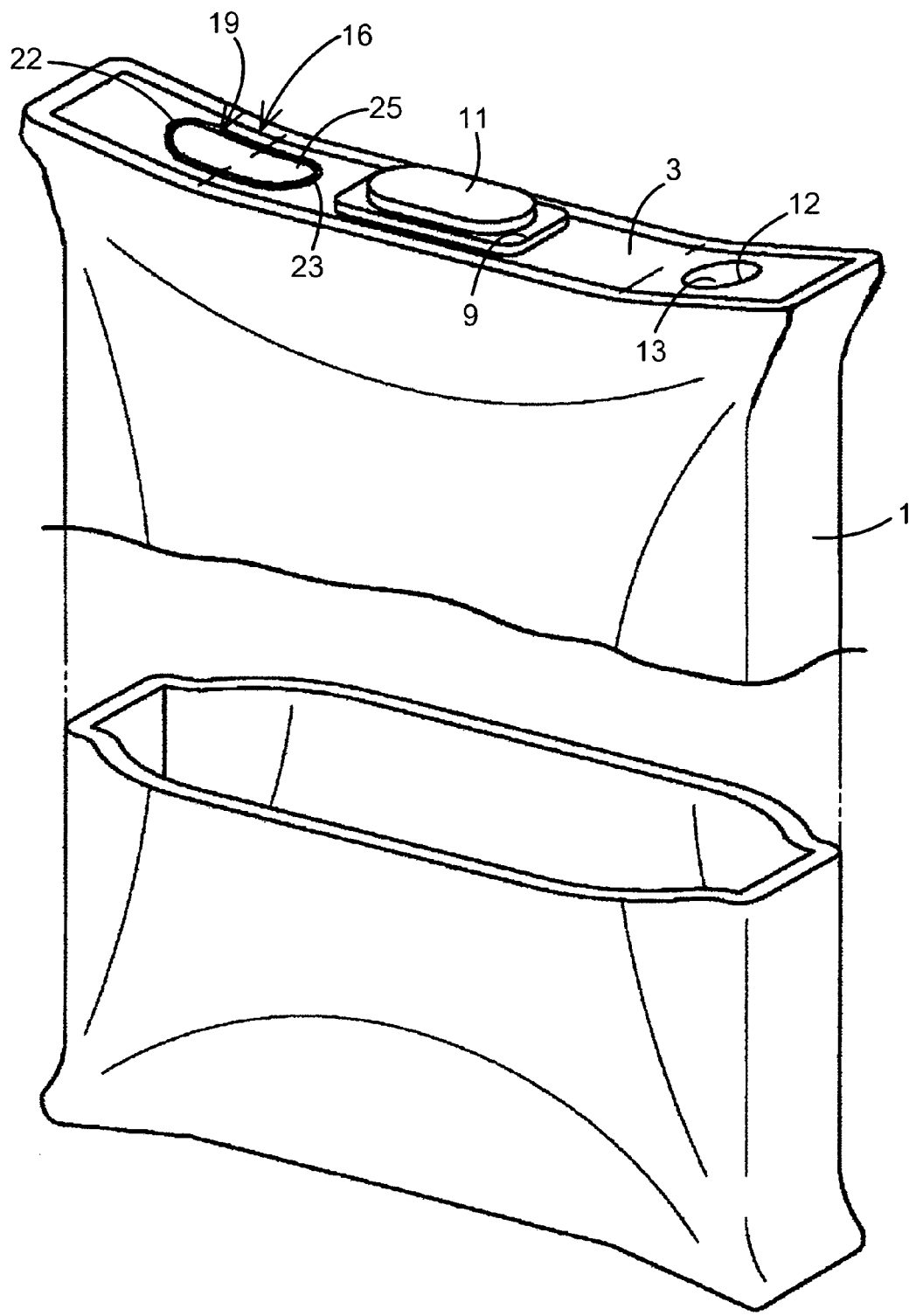
FIG. 4 is a perspective view for explaining the expanded state of the battery.

More specifically, assuming the thickness of the lateral side section 20 be a value of 1, the thickness of the lateral side section 21 should preferable be a value of 1.5 to 3.0 and the thickness of the thin-walled valve body 25 should preferable be a value of 2.0 to 5.0. Moreover, for stable and reliable vent opening in the thin sealed prismatic battery, the thickness of the lateral side section 20 should preferably be 20 to 50 μm and more preferably be 25 to 40 μm. This is because if the thickness of the lateral side section 20 is smaller than 20 μm, not only the damage on the vent tends to occur upon impact caused by falling of the battery or the like, but also the opening of the vent sometimes occur when the battery is stored in a normal circumstance, whereas if the thickness is larger than 50 μm, the opening pressure increases, which may cause burst of the battery before the vent opens. Moreover, since the larger width size of the circumferential groove increases the working pressure of the vent and disadvantageously influences the opening efficiency, the width should preferably be 0.15 to 0.3 mm. As described above, an abnormal rise of the battery internal pressure causes expansion and deformation of the battery. According to specific observation of the expansion behavior of the battery, as shown in FIG. 4, central sections of the front and rear walls, which are large area sections of the battery can 1, expand anteroposteriorly. Consequently, the cap 3 is deformed into a curved state with its central section being curved toward the inside of the battery and the lateral end sections being lifted up.

Due to the deformation of the battery, tensile force acts on each region, and since two lateral side sections 20, 21 in the safety vent 16 are different in thickness, the lateral side section 20 smaller in thickness suffers cracks, from which gas is likely to go out. At this moment, since the gas serves as pressing force to press the thin-walled valve body 25, which is hard to deform due to its large thickness and which has a large area, to the outside of the battery, a groove section of the lateral side section 20 fully splits and with the blowing force of the gas and the force by the deformation of the battery, the thin-walled valve body 25 is folded at the lateral side section 21 and is opened widely. Consequently, the gas in the battery goes out swiftly, which makes it possible to ensure prevention of the burst of the battery.

Figure 6:
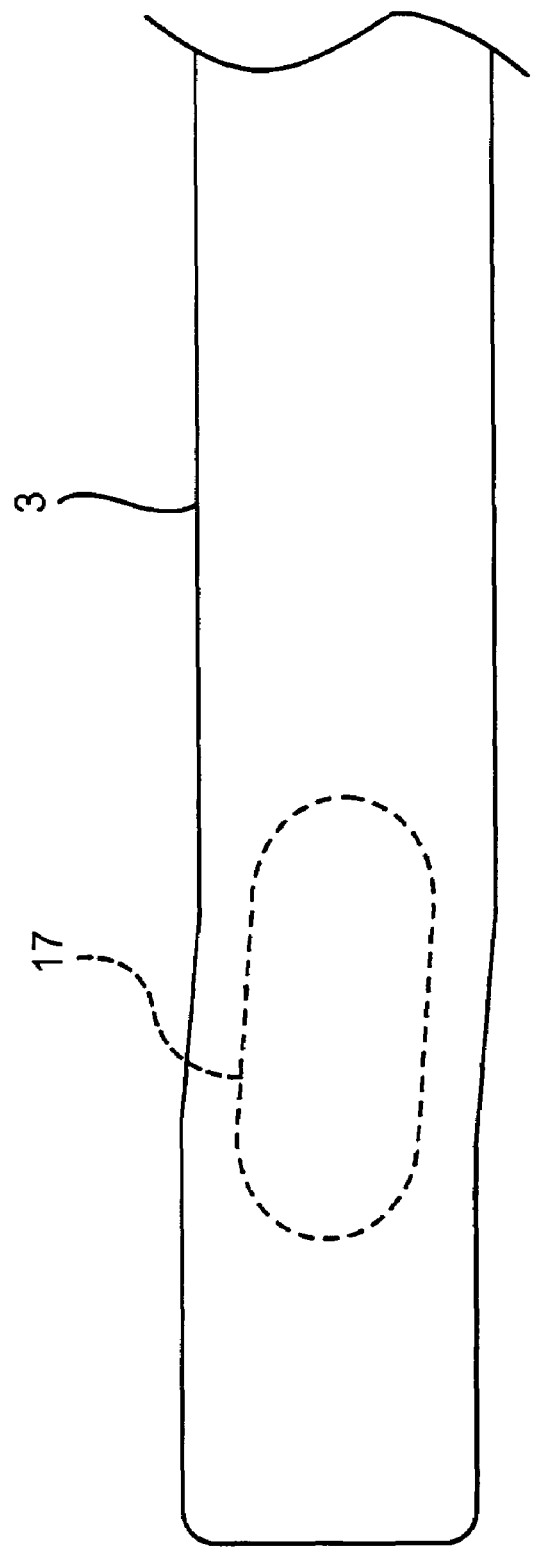
FIG. 6 is a view showing the deformation of the cap in a drop test.

Moreover, referring to FIG. 1, if a shorter width W2 of the oval-shaped safety vent 16 is 60% or more of a width W1 of the laterally long cap 3 sealing the upper opening of the battery can 1, the opening of the safety vent 16 by the battery internal pressure occurs more easily, which is more preferable. However, since the damage on the safety vent 16 and the deformation of the cap 3 as shown in FIG. 6 at the time of the falling of the battery become more likely to occur, the width W2 should preferably be 75% or less and more preferably be 70% or less of the width W1 of the cap 3.

Moreover, the outermost coining section 17 on the outer surface of the cap 3 and on one end side in the lateral direction of the cap 3 is changed from a rectangular shape to an oval shape, so that the strength against the deformation of the cap 3 caused by external force typically generated upon falling of the battery can be increased by the circular arc sections of the outermost coining section 17.

As described above, in the safety vent 16 in the preset invention, the lateral side section 20, the lateral side section 21 and the thin-walled valve body 25 are set to be thicker in this order, so that the safety vent 16 stably and reliably operates in an abnormal rise of the battery internal pressure.

The circumferential groove 19 can easily and reliably formed through press working to the upper surface of the safety vent 16. This also allows more stable and reliable opening of the safety vent 16.

Embodiment 1

FIGS. 1-4 show a lithium-ion secondary battery as a slim sealed prismatic battery in an embodiment 1 according to the present invention. As shown in FIG. 4, the battery includes a bottomed rectangular tube-like battery can 1 having a laterally long opening on the upper surface, an electrode body 2 and nonaqueous electrolyte housed in the battery can 1, a laterally long cap 3 sealing the upper opening of the battery can 1, and an insulator 5 made of plastic placed inside the cap 3. The battery can 1 is formed into a vertically long slim shape by deep-drawing of a plate made of aluminum or an alloy thereof, with a lateral length size of 34 mm, a vertical height size of 50 mm and a thickness size of 3.8 mm.

The electrode body 2 formed by winding sheet-like positive electrode and negative electrode in a spiral way with a separator made of microporous polyethylene film interposed therebetween. From the positive electrode, a thin plate-like positive electrode collector lead 6 made of aluminum or an aluminum alloy is led upward. From the negative electrode, a thin plate-like negative electrode collector lead 7 made of nickel, copper or a complex such as clad metals of nickel and copper is led upward.

The cap 3 is formed by press molding of a plate made of an aluminum alloy and the like, and a negative terminal 11 is mounted on the center of the cap 3 in a penetrating manner via an upper-side insulating packing 9 and a lower-side insulating plate 10. On the right end side of the cap 3 in the lateral direction, a round injection hole 12 for injecting electrolyte into the battery can 1 is formed in a vertically penetrating manner. The injection hole 12 is sealed by a plug 13 after injection of the electrolyte.

A lead body 15 made of a laterally long thin plate is connected to the lower end of the negative terminal 11 on the inner surface of the cap 3. The lead body 15 extends to the opposite side of the injection hole 12 and is insulated from the cap 3 by the lower-side insulating plate 10. The negative electrode collector lead is welded to the lower surface of the lead body 15. The positive electrode collector lead 6 is welded on the back surface of the cap 3 to be placed in a space between the insulating plate 10 and the injection hole 12. Consequently, the positive electrode collector lead 6 is electrically connected to the cap 3 and the battery can 1 and thereby the cap 3 and the battery can 1 are charged with a positive potential.

In assembling the battery, the negative terminal 11, upper and lower insulating packings 9, 10 and the lead body 15 are mounted on the cap 3 to form a sealing body, the electrode body 2 is housed in the battery can 1, and then the negative electrode collector lead 7 is welded to the lead body 15 of the sealing body while the positive electrode collector lead 6 is welded to the cap 3 of the sealing body in the manner described above. Next, after the sealing body is seal-welded to an aperture periphery of the battery can 1, the electrolyte is injected into the injection hole 12 and the injection hole 12 is sealed, by which the battery is completed.

Figure 2:
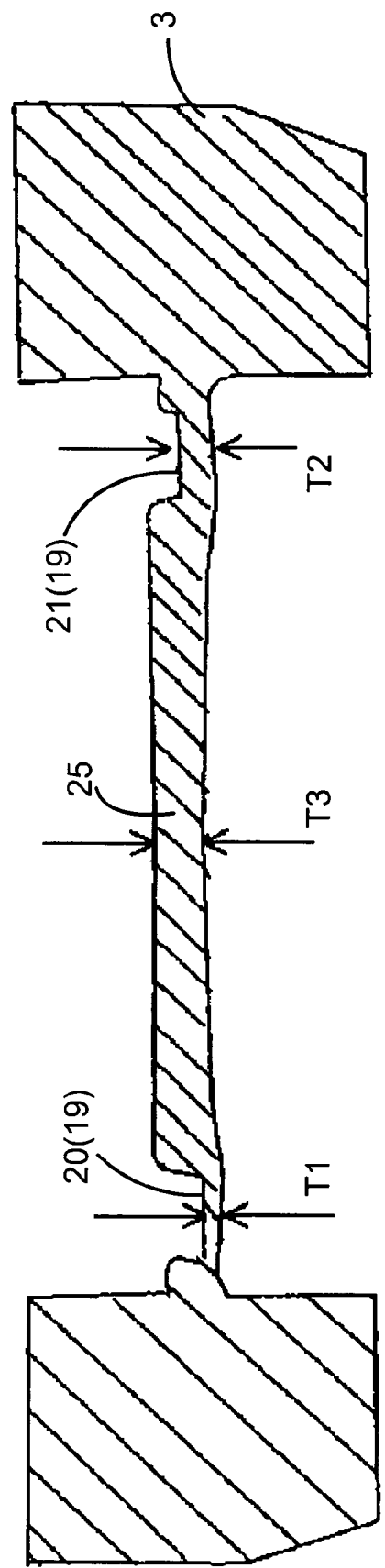
FIG. 2 is a cross sectional view taken along an A-A line in FIG. 1.
Figure 3:
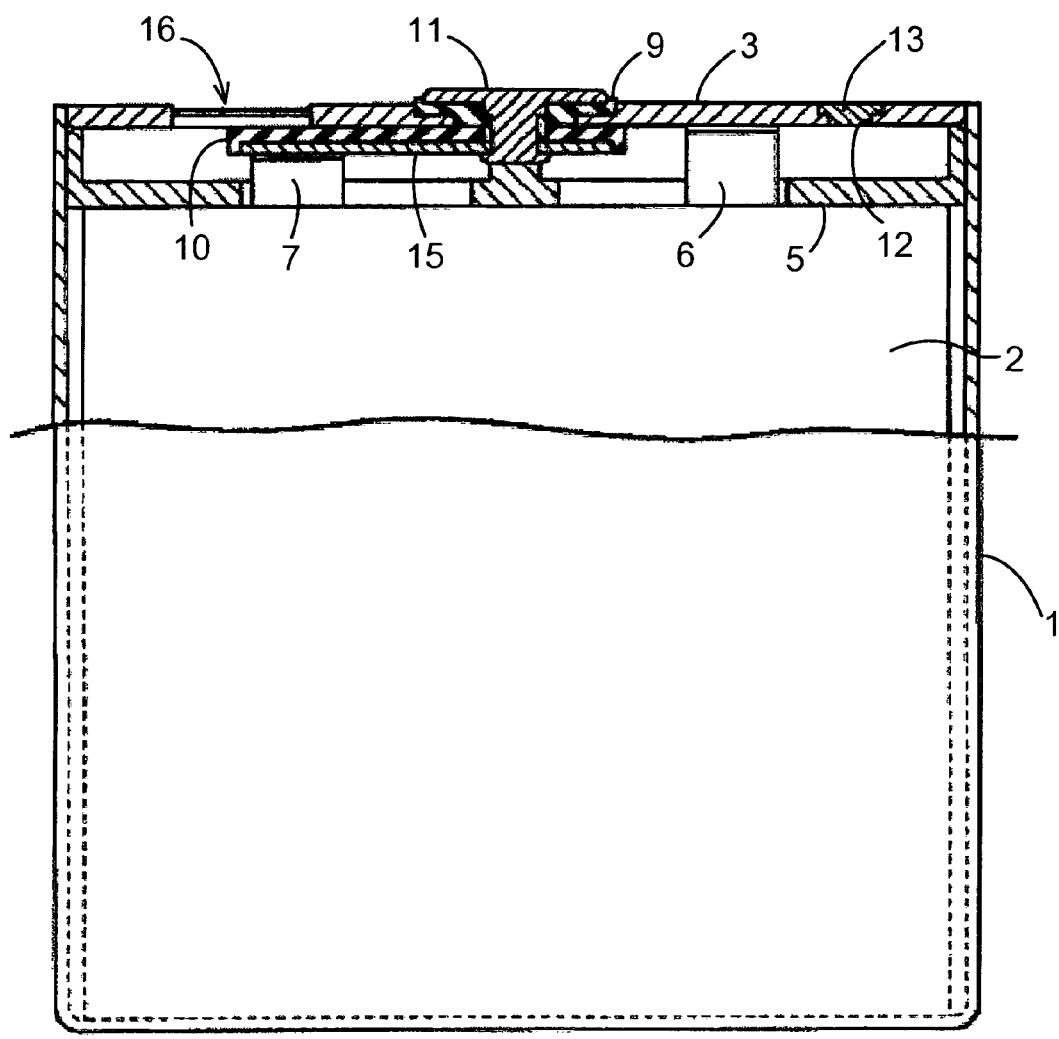
FIG. 3 is a vertical side section view showing a battery.

On one end side in the lateral direction of the cap 3 (left end side in the drawing), a safety vent 16 which opens in an abnormal rise of the battery internal pressure is formed. As shown in FIGS. 1 and 2, the safety vent 16 is composed of a laterally long oval-shaped circumferential groove 19 formed inside an oval-shaped outermost coining section 17 and a thin-walled valve body 25 surrounded thereby on the outer surface of the cap 3.

The circumferential groove 19 is composed of two lateral side sections 20, 21 parallel to the lateral direction of the cap 3 and two circular arc-shaped groove sections 22, 23 respectively connecting end portions of the lateral side sections 20, 21.

During the deformation of the battery due to increase of the internal pressure, the cap 3 tends to be deformed into a curved state with its central section being curved toward the inside of the battery and the lateral end sections being lifted up, and therefore the deformation of the cap 3 is larger in the lateral end sections, advantageously causing the opening of the safety vent 16. However, when external impact caused by the falling of the battery or the like is exerted on the battery, the safety vent 16 may be damaged, and therefore it is preferable that the safety vent 16 should be positioned on the slightly central side from the lateral end sections in the lateral direction on the cap 3.

A portion surrounded by the circumferential groove 19 constitutes the laterally long thin-walled valve body 25. The groove width size of the circumferential groove 19 was all set at 0.2 mm. It is to be noted that the circumferential groove 19 can be formed through press working.

As shown in FIG. 2, the thickness of the lateral side section 21 in the circumferential groove 19 was set to be larger than the thickness of the other groove sections 20, 22, 23. More specifically, the thickness size T2 of the groove section of the lateral side section 21 was 0.07 mm, whereas the thickness size T1 of each groove section of the lateral side section 20 and the circular arc sections 22, 23 was set at 0.031 mm, respectively. This means that T2/T1 is 2.3. The thickness T3 of the thin-walled valve body 25 was se at 0.135 mm. This means that T3/T1 is 4.4. The cap 3 was set to have a lateral length size of 33.26 mm, a thickness size of 3.62 mm and a vertical height size of 0.8 mm. The safety vent 16 is put at a place where the cap 3 is folded when the battery suffers expansion and deformation due to an abnormal rise of the battery internal pressure. That is, a length size L1 from the lateral center of the safety vent 16 to the left end of the cap 3 was set at 5.8 mm. The safety vent 16 was set to have a lateral length size of 4.9 mm and a thickness size of 2 mm. This means that a ratio of the thickness size of the safety vent 16 to the thickness size of the cap 3 is 63.5%.

A ratio (L1/L2) of the length size L1 from the lateral center of the safety vent 16 to the left end of the cap 3 to the lateral length size L2 of the cap 3, which should preferably be in the range of 0.1 to 0.25, was set at 0.18 in the embodiment 1. If the ratio is smaller than 0.1, the safety vent 16 is too close to the left end of the cap 3, and this causes the safety vent 16 to be compressed in the lateral direction and makes opening difficult at the time of the increase of the battery internal pressure. If the ratio is larger than 0.25, the safety vent 16 is too close to the center of the battery, causing the lead body 15 to overlap with the lower surface of the safety vent 16, which disturbs blowing of gas from the inside of the battery, resulting in possible burst of the battery.

Embodiment 2

The thickness size T2 of the lateral side section 21 was set at 0.08 mm, and the thickness size T1 of each groove section of the lateral side section 20 and the circular arc sections 22, 23 was set at 0.034 mm, respectively. This means that T2/T1 is 2.4 and T3/T1 is 4.0. Other features are similar to those of the embodiment 1 and therefore the description thereof will be omitted.

Embodiment 3

The thickness size T2 of the lateral side section 21 was set at 0.07 mm, and the thickness size T1 of each groove section of the lateral side section 20 and the circular arc sections 22, 23 was set at 0.028 mm, respectively. This means that T2/T1 is 2.5 and T3/T1 is 4.8. Other features are similar to those of the embodiment 1 and therefore the description thereof will be omitted.

Embodiment 4

The thickness size of the battery was set at 4.0 mm and the thickness size of the safety vent 16 was set to be 2.5 mm accordingly. The thickness size T2 of the lateral side section 21 was set at 0.07 mm, and the thickness size T1 of each groove section of the lateral side section 20 and the circular arc sections 22, 23 was set at 0.037 mm, respectively. This means that T2/T1 is 1.9. The thickness T3 of the thin-walled valve body 25 was set to be 0.15 mm. This means that T3/T1 is 4.1. Other features are similar to those of the embodiment 1 and therefore the description thereof will be omitted.

Embodiment 5

The thickness size T2 of the lateral side section 21 was set at 0.07 mm, and the thickness size T1 of each groove section of the lateral side section 20 and the circular arc sections 22, 23 was set at 0.034 mm, respectively. This means that T2/T1 is 2.1. Other features were similar to those of the embodiment 4.

Embodiment 6

The lateral length size of the battery was set at 30 mm, the vertical height size was set at 48 mm. The thickness T2 of the lateral side section 21 was set at 0.07 mm, and the thickness size T1 of each groove section of the lateral side section 20 and the circular arc sections 22, 23 was set at 0.033 mm, respectively. This means that T2/T1 is 2.1. Moreover, the length size L1 from the lateral center of the safety vent 16 to the left end of the cap 3 was 4.75 mm, the lateral length size L2 of the cap 3 was 28.95 mm, and a ratio (L1/L2) was 0.16. Other features were similar to those of the embodiment 4.

Embodiment 7

The thickness size T2 of the lateral side section 21 was set at 0.08 mm, and the thickness size T1 of each groove section of the lateral side section 20 and the circular arc sections 22, 23 was set at 0.033 mm, respectively. This means that T2/T1 is 2.4. Other features were similar to those of the embodiment 6.

Comparative Example 1

The comparative example 1 shares the same features with the embodiment 1 except the point that the thickness sizes T1, T2 of each groove section constituting the safety vent was all set at 0.032 mm. This means that T2/T1 is 1.0.

Comparative Example 2

The comparative example 2 shares the same features with the embodiment 1 except the point that the thickness sizes T1, T2 of each groove section constituting the safety vent were all set at 0.04 mm. This means that T2/T1 is 1.0.

Comparative Example 3

The comparative example 3 shares the same features with the embodiment 1 except the point that the thickness size T1 of each groove section of the lateral side section 20 and the circular arc sections 22, 23 was each set at 0.035 mm, the thickness size T2 of the lateral side section 21 and the thickness size T3 of the thin-walled valve body 25 were both set at 0.065 mm, and that the groove corresponding to the lateral side section 21 in the circumferential groove 19 was removed. This means that T2/T1 is 1.9, and T3/T1 is 1.9.

Comparative Example 4

The comparative example 4 shares the same features with the embodiment 4 except the point that the thickness sizes T1, T2 of each groove section constituting the safety vent was all set at 0.033 mm. This means that T2/T1 is 1.0.

Comparative Example 5

The comparative example 5 shares the same features with the embodiment 5 except the point that the thickness sizes T1, T2 of each groove section constituting the safety vent were all set at 0.032 mm. This means that T2/T1 is 1.0.

Comparative Example 6

Figure 5:
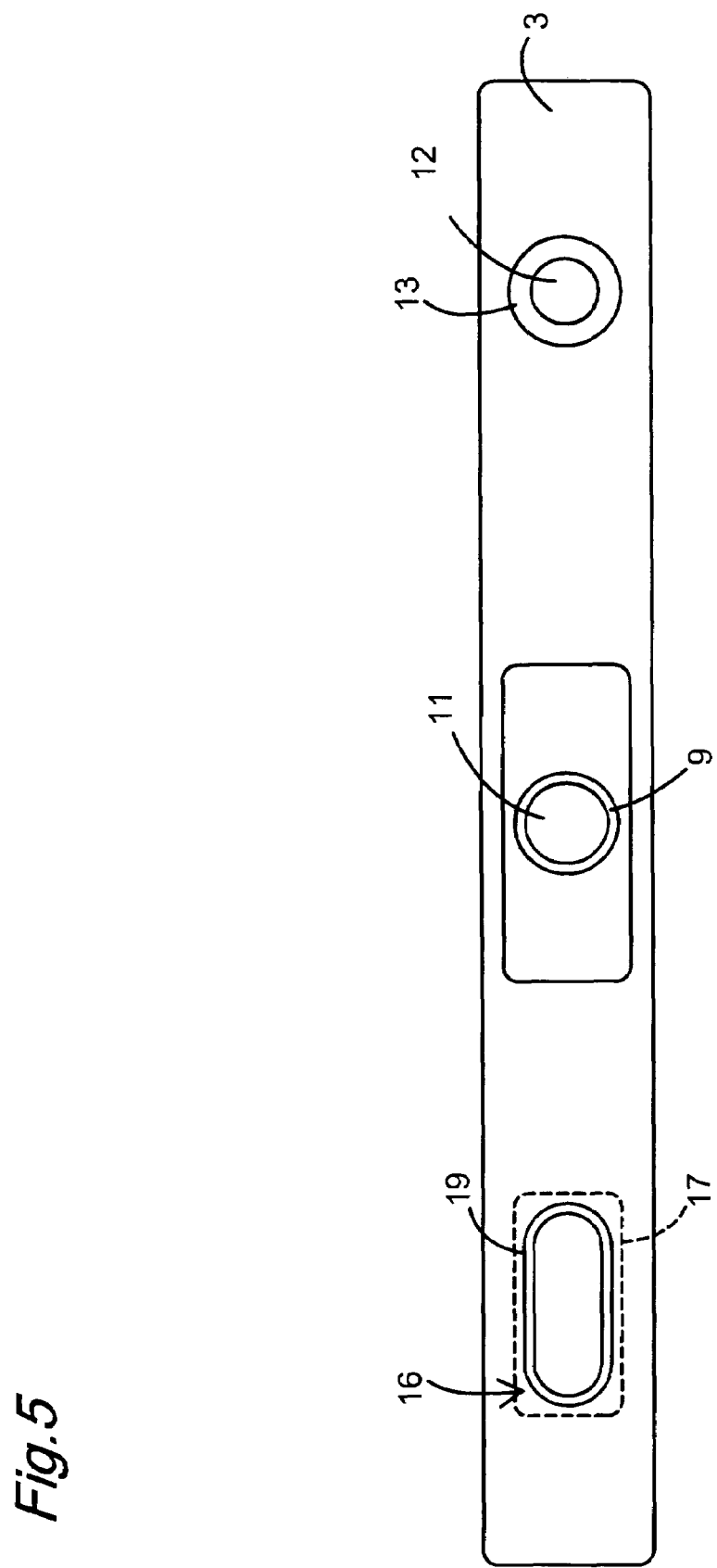
FIG. 5 is a plan view showing a cap of a conventional sealed prismatic battery.

The comparative example 6 shares the same features with the embodiment 1 except the point that the outermost coining section 17 is formed into a generally rectangular shape as shown in FIG. 5, the thickness size T2 of the lateral side section 21 was set at 0.07 mm, the thickness size T1 of each groove section of the lateral side section 20 and the circular arc sections 22, 23 was each set at 0.03 mm, and that the thickness size T3 of the thin-walled valve body 25 was set at 0.135 mm. This means that T2/T1 is 2.3, and T3/T1 is 4.5.

The batteries of the embodiments 1 to 7 according to in the present invention and the batteries of the comparative examples 1 to 6 are each prepared for measuring the working pressure of the safety vent 16 and confirming the opening efficiency. Instead of housing the electrode body 2 and the electrolyte in each of the battery can 1, a hole was made on the bottom wall of the battery can 1, and water was injected into the battery through the hole so as to gradually increase the battery internal pressure (water pressure) for measuring the working pressure of the safety vent 16 and confirming the opening efficiency.

More specifically, in the measurement of the working pressure, the water pressure was measured as the working pressure when the safety vent 16 opened or cracked were generated for water to leak. In the confirmation of the opening efficiency, the number of test pieces which were visually confirmed that their groove sections other than the lateral side section 21 split almost completely was counted. The number of the test pieces for each battery was fifty. Five sets of the drop test were conducted for each test piece with one set consisting of dropping from a height of 1.5 m onto an iron plate two times for each six surface of the test piece facing down, and after the five sets of the drop test were conducted for all the test pieces, the number of the test pieces exhibiting damage on the safety vent 16 and deformation of the cap 3 was confirmed. The number of the test pieces for each battery was ten. Table 1 shows the result of the test.

TABLE 1

| | Working Pressure (MPa) | Opening Efficiency (unit) | Drop Test (unit) |
|---|---|---|---|
| Embodiment 1 | 1.54 | 50 | 0 |
| Embodiment 2 | 1.62 | 50 | 0 |
| Embodiment 3 | 1.42 | 50 | 0 |
| Embodiment 4 | 1.76 | 50 | 0 |
| Embodiment 5 | 1.65 | 50 | 0 |
| Embodiment 6 | 1.55 | 50 | 0 |
| Embodiment 7 | 1.57 | 50 | 0 |
| Comparative Example 1 | 0.80 | 0 | 0 |
| Comparative Example 2 | 1.05 | 0 | 0 |
| Comparative Example 3 | 1.69 | 38 | 0 |
| Comparative Example 4 | 0.86 | 0 | 0 |
| Comparative Example 5 | 0.81 | 0 | 0 |
| Comparative Example 6 | 1.47 | 26 | 8 |

In the measurement of the working pressure, as shown in Table 1, comparison between the embodiments 1 to 3 and the comparative examples 1 to 3, each having the same battery size, indicated that setting the lateral side section 21 to be larger in thickness than the lateral side section 20 kept the working pressure low and led to extreme enhancement of the opening efficiency. It was also indicated that this effect applied with the battery size changed. In the case where the thin-walled valve body 25 and the lateral side section 21 had the same thickness, the deformation of the thin-walled valve body 25 also occurred at the time of opening, which disturbed smooth opening of the groove sections other than the lateral side section 21, resulting in increase in working pressure and degradation in opening efficiency.

Moreover, forming the outermost coining section 17 into an oval shape alleviated the deformation of the safety vent 16 and the cap 3 in the drop test.

Moreover, changing the outermost coining section 17 from a generally rectangular shape to an oval shape alleviated the deformation of the cap in the drop test.

Although the present invention has been fully described by way of examples with reference to the accompanying drawings, it is to be noted that various changes and modifications will be apparent to those skilled in the art. Therefore, unless otherwise such changes and modifications depart from the spirit and the scope of the present invention, they should be construed as being included therein.

What is claimed is:

1. A sealed prismatic battery, comprising:
   a laterally long cap sealing an opening of an upper surface of a battery can; and
   a safety vent placed on the cap and having a thin-walled valve body which opens in an abnormal rise of a battery internal pressure,
   wherein the safety vent has an oval-shaped circumferential groove formed inside an oval-shaped coining section provided on an outer surface of the cap and on one end side in a lateral direction of the cap and a thin-walled valve body surrounded thereby, and the oval-shaped circumferential groove is composed of lateral side sections parallel to the lateral direction of the cap and circular arc sections connecting these lateral side sections, with one lateral side section, other lateral side section, and the thin-walled valve body of the safety vent respectively having a thickness increased in this order, and the groove starts splitting from the one lateral side section having the thickness thinner than the other later side section due to expansion and deformation of the battery caused by an abnormal rise of the battery internal pressure.

2. The sealed prismatic battery according to claim 1, wherein the thicknesses of the circular arc sections connecting the lateral side sections are the same as the thickness of the one lateral side section.

3. The sealed prismatic battery according to claim 2, wherein an outer surface of the safety vent is positioned on the inside from an outer surface of the cap, and the outer surface of the safety vent is positioned on the outside from an inner surface of the cap.

4. The sealed prismatic battery according to claim 2, wherein a thickness of the other lateral side section in the circumferential groove is 1.5 to 3.0 times larger than a thickness of one lateral side section in the circumferential groove.

5. The sealed prismatic battery according to claim 2, wherein a thickness of the thin-walled valve body in the safety vent is 2.0 to 5.0 times larger than a thickness of one lateral side section in the circumferential groove.

6. The sealed prismatic battery according to claim 2, wherein
a width of the oval-shaped safety vent is 60 to 75% of a width of the cap.

7. The sealed prismatic battery according to claim 6, wherein the other lateral side section having the thickness thicker than the thickness of the one lateral side section does not split due to expansion and deformation of the battery caused by an abnormal rise of the battery internal pressure.

* * * * *